US007096825B2

(12) United States Patent  (10) Patent No.: US 7,096,825 B2
Kim  (45) Date of Patent: Aug. 29, 2006

(54) BIRD LAUNCHER FOR HUNT TRAINING (75) Inventor: J. S. Kim, Dallas, TX (US)

(73) Assignee: D.T. Systems, Inc., Dallas, TX (US)

( * ) Notice: Subject to any disclaimer, the term of this patent is extended or adjusted under 35 U.S.C. 154(b) by 0 days.

(21) Appl. No.: 10/923,244

(22) Filed: Aug. 20, 2004

(65) Prior Publication Data

US 2005/0045114 A1    Mar. 3, 2005

(51) Int. Cl.
*A01K 31/10*    (2006.01)
(52) U.S. Cl. .................................................. 119/427
(58) Field of Classification Search ............... 119/427, 119/702, 720; 124/17, 56; 89/1.815; D22/113, D22/114; 446/63, 429, 430; D21/454
See application file for complete search history.

(56) References Cited

U.S. PATENT DOCUMENTS

| | | | | |
|---|---|---|---|---|
| 3,080,850 A * | 3/1963 | Schrougham | ............ | 119/427 |
| 5,694,913 A * | 12/1997 | Parrott | ............ | 124/17 |
| 5,983,551 A * | 11/1999 | Lalor | ............ | 119/720 |
| 6,182,609 B1 * | 2/2001 | Sparkman | ............ | 119/427 |
| 6,505,577 B1 * | 1/2003 | Putnam | ............ | 119/702 |
| 2002/0033143 A1 * | 3/2002 | So | ............ | 119/427 |
| 2005/0172912 A1 * | 8/2005 | Crist et al. | ............ | 119/720 |

\* cited by examiner

*Primary Examiner*—Robert P. Swiatek
*Assistant Examiner*—Elizabeth Shaw
(74) *Attorney, Agent, or Firm*—Garlick Harrison & Markison; James A. Harrison (57) ABSTRACT

A bird launcher for hunt training with a door through which a bird is placed in a guide belt in an interior of a housing substantially eliminates injury to the bird. An elastic spring mounted at one end of an operating rod substantially eliminates inadvertent movement of an operating rod thereby preventing a premature launch, thus improving the safety of the operator and the bird. A fixing member is centered on the bird launcher's longitudinal center line and extends to at least one-half of a length of guide rods. The fixing member places pressure in the approximate center of the guide rods thereby preventing the guide rods from opening at the ends and additionally creating a balanced release point when the bird launcher is activated. The balance release point ensures a more stabilized launch so that the bird is released in a desired direction.

9 Claims, 11 Drawing Sheets

BIRD LAUNCHER FOR HUNT TRAINING

CROSS REFERENCE TO RELATED PATENTS

This application claims priority to Korean Patent Application Serial No. 20-20030027836, filed Aug. 29, 2003, which is incorporated herein by reference in its entirety for all purposes.

BACKGROUND OF THE INVENTION

1. Technical Field of the Invention

The present invention relates to a bird launcher for training hunting dogs.

2. Description of Related Art

Hunting is actively pursued by millions of Americans every year. Recent government data shows that more than 14 million people actively hunt a variety of game animals and spend more than 20 billion dollars. There are over three million migratory bird (duck, geese, dove, quail) hunters who collectively spend approximately 1.3 billion dollars on equipment, ammunition, decoys, and other hunting-related expenses. Part of the hunting-related expenses include more than 120 million dollars that is spent for hunting dogs and associated expenses.

Migratory bird hunters are often assigned a daily quota. The quota is designed, in part, to ensure a species is not over hunted, thus helping to maintain future populations. A hunter, therefore, is interested in retrieving all downed birds. Consequently, many migratory bird hunters use dogs to retrieve downed birds on both land and water. Before dogs can be used to retrieve the bird, they must be trained to locate and return the bird when so commanded. The dog must be conditioned to ignore the explosive report of the muzzle blast and to wait for the hunter's command to retrieve the game. The large caliber shotguns normally used in hunting waterfowl have loud muzzle blasts which would, without training, distract the dog. The dog could be trained during actual hunting but this creates a potentially dangerous environment for the dog when other hunters are in the area. The safest way to train the dog is through simulated hunting wherein a device is used to launch birds in a manner that simulates a bird flushed from the ground. The hunter then shoots the bird and commands the dog to retrieve the bird. This method conditions the dog to the muzzle blast and trains the dog to retrieve the bird. Additionally, the hunter is able to practice his/her hunting skills on live game thus enhancing the hunt training. Conventional training is, however, problematic in that the bird's launch speed is substantially lower than the speed of the bird flushed in the wild. In this respect, the hunter fails to achieve a desired level of training.

Additionally, prior art launchers are difficult to load and expose the bird to injuries such as broken legs, wings, or neck when the hunter is trying to load the bird single-handed.

Figure 1:
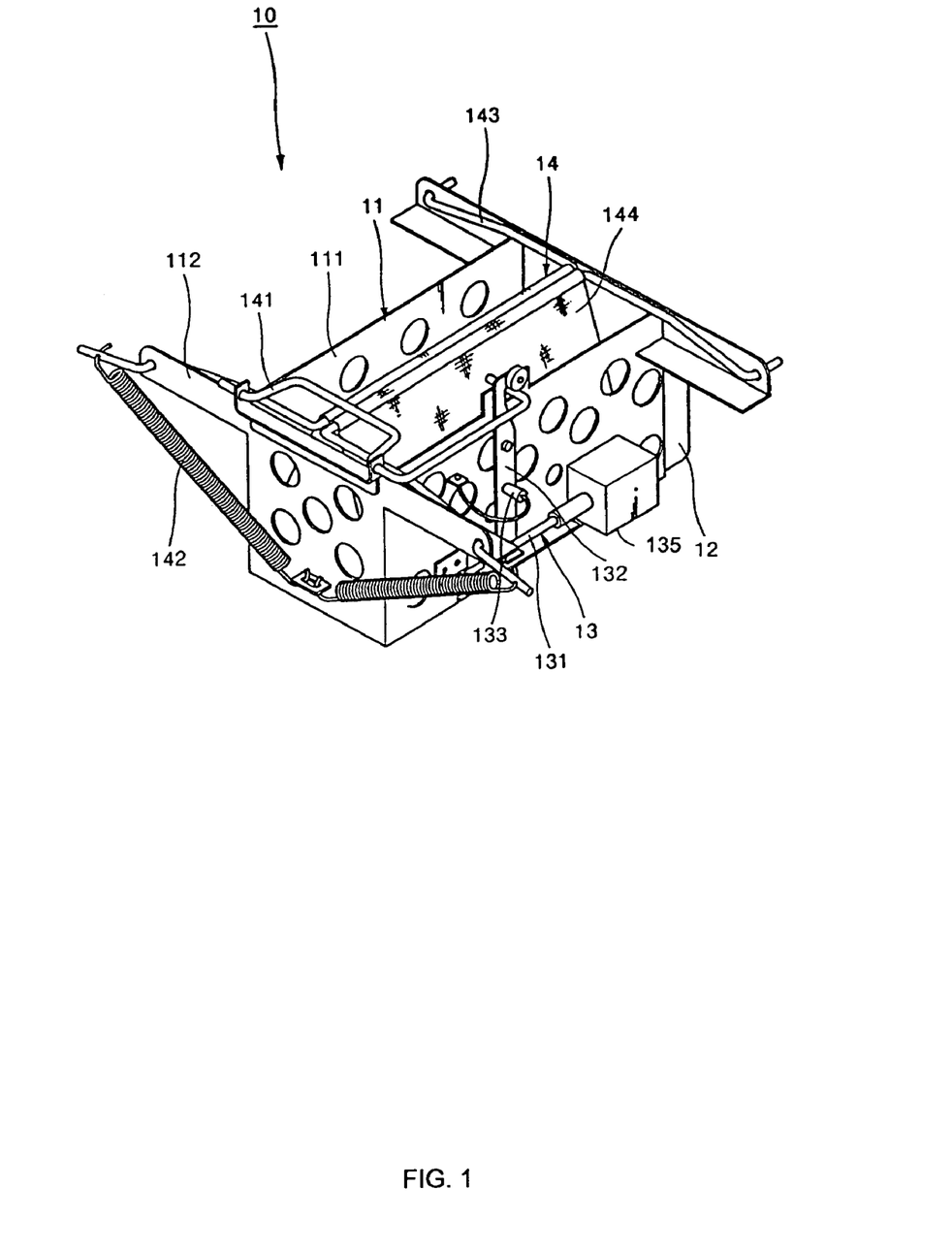
FIG. 1 is a perspective view of a prior art bird launcher.
Figure 2A:
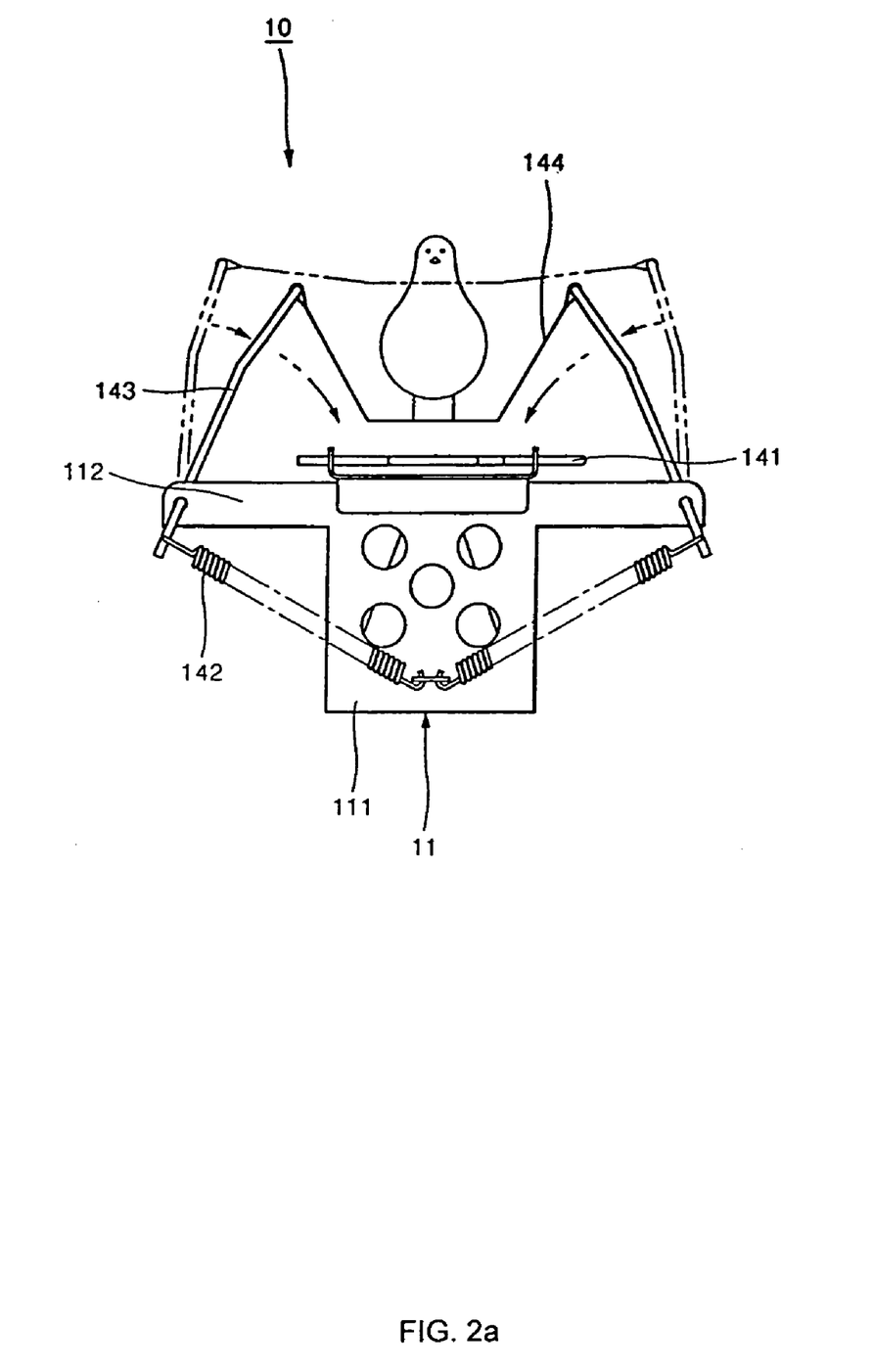
FIGS. 2a and 2b are end views of the prior art bird launcher.
Figure 2B:
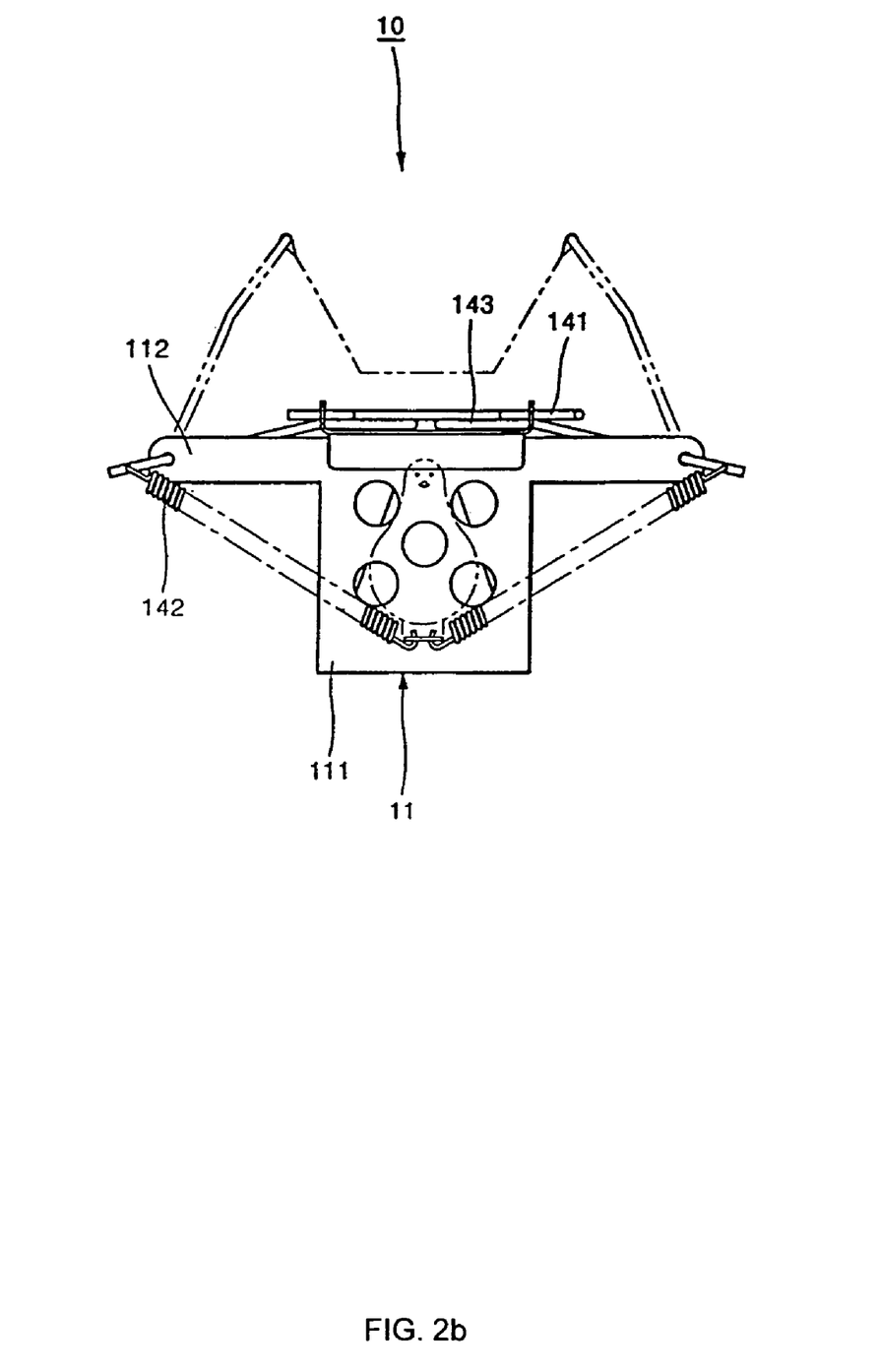
Figure 2C:
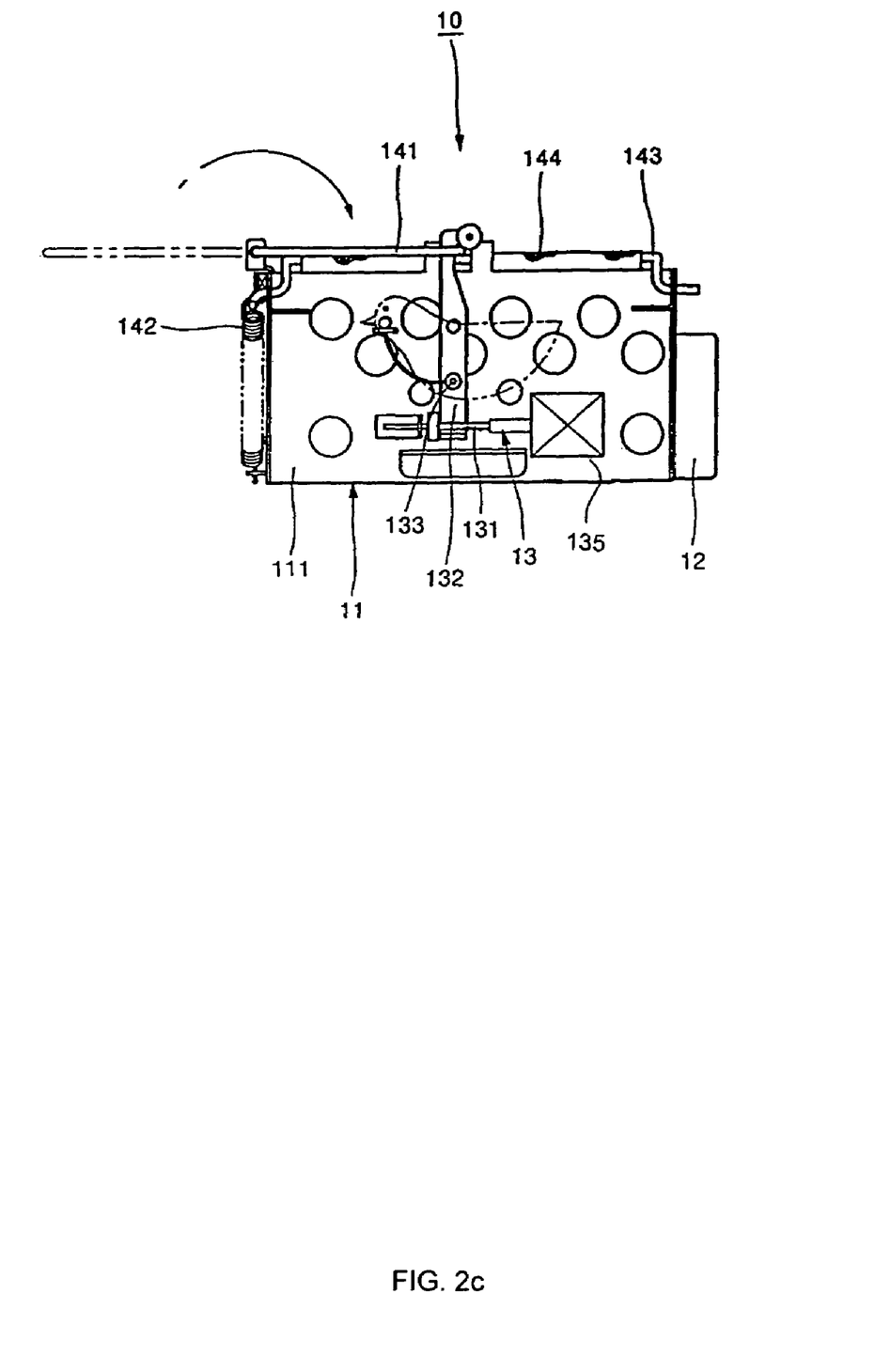
FIGS. 2c through 2e are side views of the prior art bird launcher.
Figure 2D:
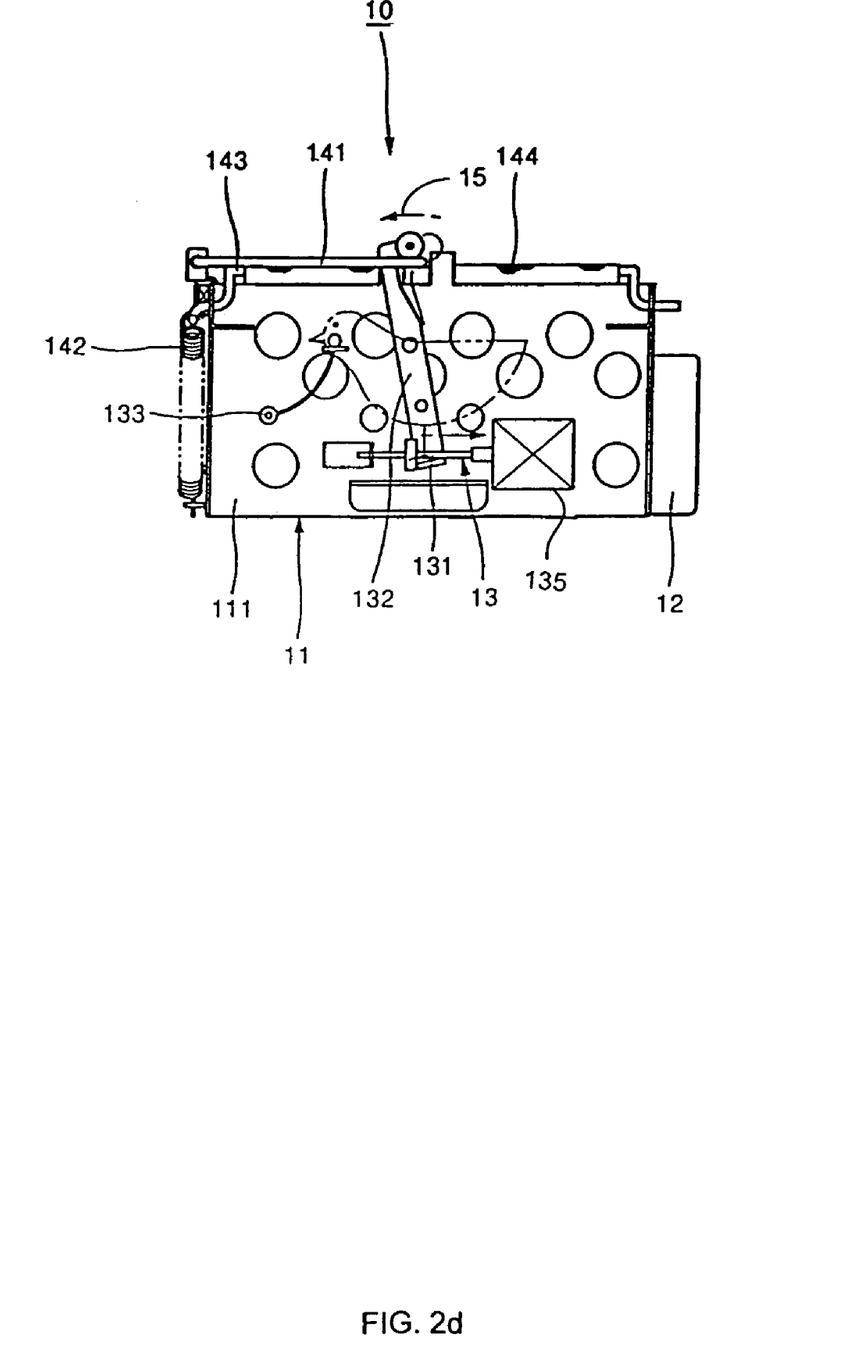
Figure 2E:
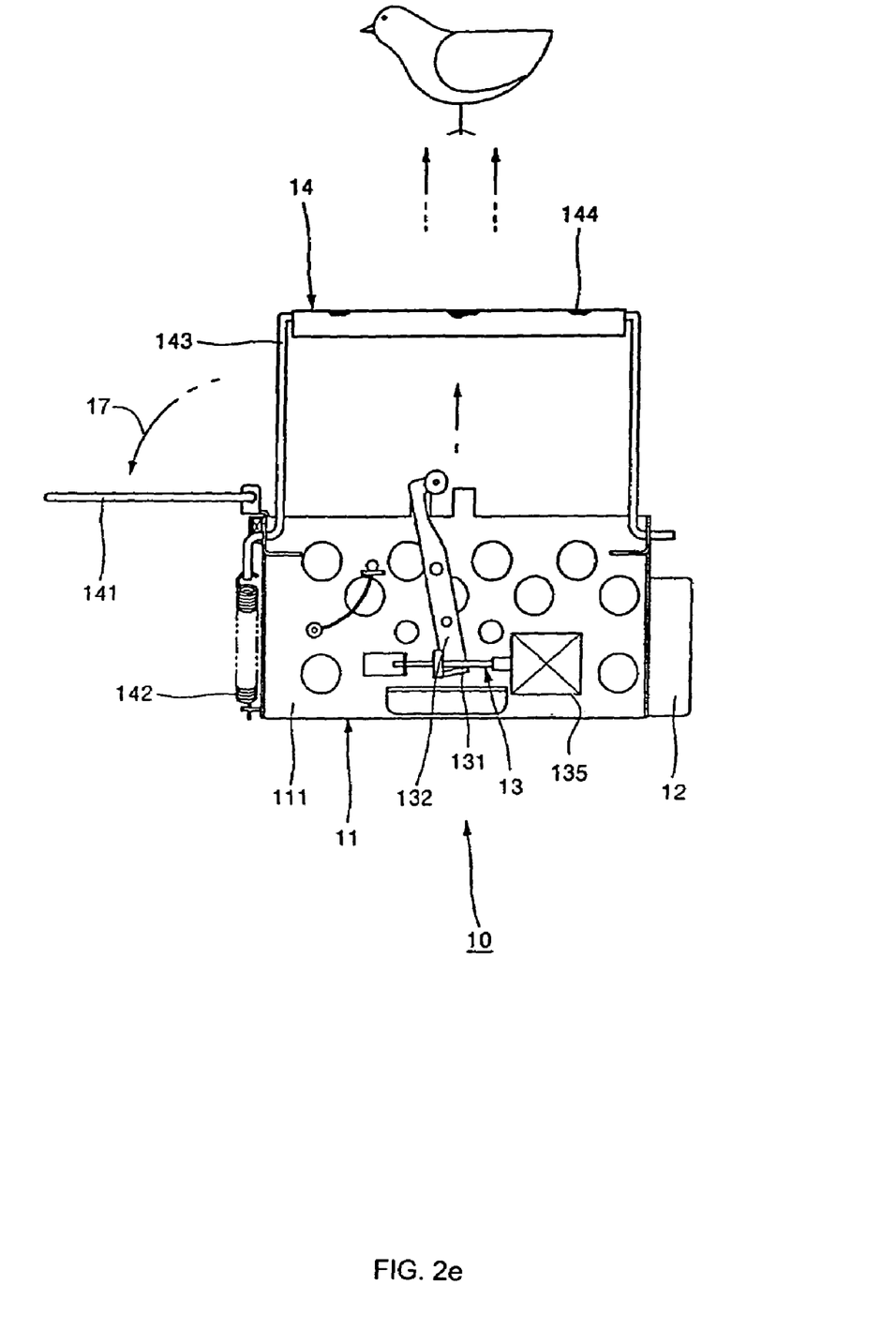

FIGS. 1 through 2e illustrate a prior art bird launcher for hunt training. FIG. 1 is a perspective view of the prior art bird launcher. As shown in FIG. 1, a bird launcher 10 includes a housing 11, a controller 12, an operation assembly 13, and a discharging assembly 14. Housing 11 has a generally square box-type of a body 111 opened at its top with support bars 112 extended widthwise from the upper corners of the sidewalls of the body 111. Controller 12 mounted at one side of the housing 11 receives signals transmitted from a remote controller (not shown). Operation assembly 13 includes a moving shaft 131, an operating rod 132, an auxiliary locking member 133, and an electromagnet 135. Moving shaft 131 is pulled by a magnetic force generated by electromagnet 135 in response to the signal received by controller 12. Operating rod 132, connected to one end of moving shaft 131, rotates by a predetermined angle when pulled by moving shaft 131.

Discharging assembly 14 includes a fixing rod 141, a pair of springs 142, a pair of guide rods 143, and a guide belt 144. Each guide rod of the pair of guide rods 143, inserted into apertures formed into ends of support bars 112, rotate toward the outside of housing 11 by the restoring force of the pair of springs 142 when fixing rod 141 is released from the locked state by the rotation of operating rod 132. Guide belt 144, attached at opposite side ends of the pair of guide rods 143, is discharged vertically as the pair of guide rods 143 are rotated toward the outside of housing 11.

As shown in the prior art of FIG. 2a, a bird, such as a pigeon, is placed on guide belt 144 while the pair of guide rods 143 of discharging assembly 14 are rotated toward the inside of housing 11 around the end portions of support bars 112 to thereby form a space in the interior of housing 11. As the pair of guide rods 143 are rotated towards the inside of housing 11, the pair of springs 142 start to obtain their restoring force, and the pair of guide rods 143 come in close contact with fixing rod 141. The bird is positioned on guide belt 144 as the pair of guide rods 143 rotate towards the inside of housing 11 creating the space in the interior of housing 11. The pair of guide rods 143 come in close contact with the top surface of housing 11 such that guide belt 144 surrounding the bird is located in the interior of housing 11, as can be seen in FIG. 2b.

Referring now to FIG. 2c, after the pair of guide rods 143 are rotated in close contact with housing 11, fixing rod 141 is rotated onto the end portion of one side of the pair of guide rods 143 such that the contact relationship between the pair of guide rods 143 and fixing rod 141 is maintained. Operating rod 132 is rotated by a predetermined angle to place fixing rod 141 in a locked state. So as to prevent accidental movement of operating rod 132, auxiliary locking member 133 is inserted through an aperture in operating rod 132 and through an aperture in one side of housing 11. The bird launcher 10 is locked and ready for launching.

When the bird launcher 10 is placed at the training site, auxiliary locking member 133 is removed from operating rod 132 and housing 11.

Referring now to FIG. 2d, a signal is transmitted by a remote controller (not shown) to the bird launcher 10. At that time, controller 12 receives the transmitted signal and generates a control signal in response to the received signal. Electromagnet 135 generates the magnetic force that pulls moving shaft 131 toward controller 12. At the same time, operating rod 132 connected to moving shaft 131 rotates by the predetermined angle, as shown by 15, thereby releasing fixing rod 141 from the locked state.

As can be seen in FIG. 2e, when fixing rod 141 is released from the locked state, the pair of guide rods 143 rotate toward the outside of housing 11 by the restoring force of the pair of springs 142 and at the same time completely rotate one side of fixing rod 141 to the outside of housing 11, as illustrated by 17. The restoring force of the pair of springs 142 is such that guide belt 144, and the bird surrounded by guide belt 144, are discharged in a vertical direction by the sudden release of the restoring force of the pair of springs 142 and the sudden stretching of guide belt 144. At this moment, the bird is launched from the bird launcher.

As described above, however, the placement of the bird on guide belt 144 is problematic in that the bird must be placed on guide belt 144 and held in that position while the pair of guide rods 143 are rotated over housing 11 and placed in the locked state. It is difficult and inconvenient to simultaneously place the bird in the interior of housing 11 while rotating the plurality of guide rods 143 against the restoring force of the pair of springs 142. This can lead to injury to the bird such as broken legs, wings, or neck. There is a need, therefore, for a humane method of placing the bird in the launcher.

Another problem is that since fixing rod 141 places pressure only at the end portions of one side of the pair of guide rods 143 to maintain the restoring force of the pair of springs 142, the end portions on the other sides of the pair of guide rods 143 are not as fully depressed by fixing rod 141 and may partially open, due to the restoring force of the pair of springs 142, such that when the bird is discharged by discharging assembly 14, the bird is discharged at an angle and flies in a different direction from that intended by the hunter, making it difficult to achieve the desired hunting effect.

A method and apparatus are needed to ensure the bird is launched substantially in a vertical direction. Moreover, the process of coupling or decoupling the auxiliary locking member 133 to operating rod 132 and housing 11 may cause movement of operating rod 132, thereby causing the accidental release of the bird, exactly the function it was intended to prevent. A need exists, therefore, for a simple yet reliable method for preventing accidental release of the bird.

BRIEF SUMMARY OF THE INVENTION

To solve the above-mentioned problems, a bird launcher for hunt training increases the bird launch speed thereby remarkably improving the training effect while substantially eliminating injury to the bird when loading the bird in the launcher.

An object of the present invention is to provide a door in the bird launcher for hunt training so that the bird is placed on the guide belt disposed in the interior of the launcher housing after the guide rods and guide belt are placed in a locked state. Provided at one of a side or end of the housing body, the door substantially reduces the risk of the bird's neck, wings or legs being caught and broken by the launcher housing. Moreover, the present bird launcher, by having a side mounted door, facilitates launching a plurality of birds at the same time. Thus, a hunter in training may practice common hunting experiences including multiple birds being flushed at the same time.

Another object of the present invention is to provide a bird launcher for hunt training wherein over one-half of a pair of guide rods are restrained by a fixing member, thereby preventing the guide rods from partially opening at one end of the launcher, thus ensuring an even release of the guide rods and further ensuring the bird is discharged in a substantially vertical direction, as intended by the hunter.

To achieve the above objectives, the described embodiment of the present invention includes a bird launcher for hunt training that includes a door mounted at one of a side or end of the body of the housing for inserting the bird. An elastic spring elastically mounted at one side of the operating rod rotated by the moving shaft prevents accidental movement of the operating rod. A fixing member adapted to be locked by the operating rod places a restraining pressure over at least one-half of the length of the guide rods to prevent the guide rods from being opened at the end portions of the other sides.

The above-referenced description of the summary of the invention captures some, but not all, of the various aspects of the present invention. The claims are directed to some of the various other embodiments of the subject matter towards which the present invention is directed. In addition, other aspects, advantages and novel features of the invention will become apparent from the following detailed description of the invention when considered in conjunction with the accompanying drawings.

DETAILED DESCRIPTION OF THE INVENTION

Reference will now be made in detail to the preferred embodiments of the present invention, examples of which are illustrated in the accompanying drawings.

Figure 3:
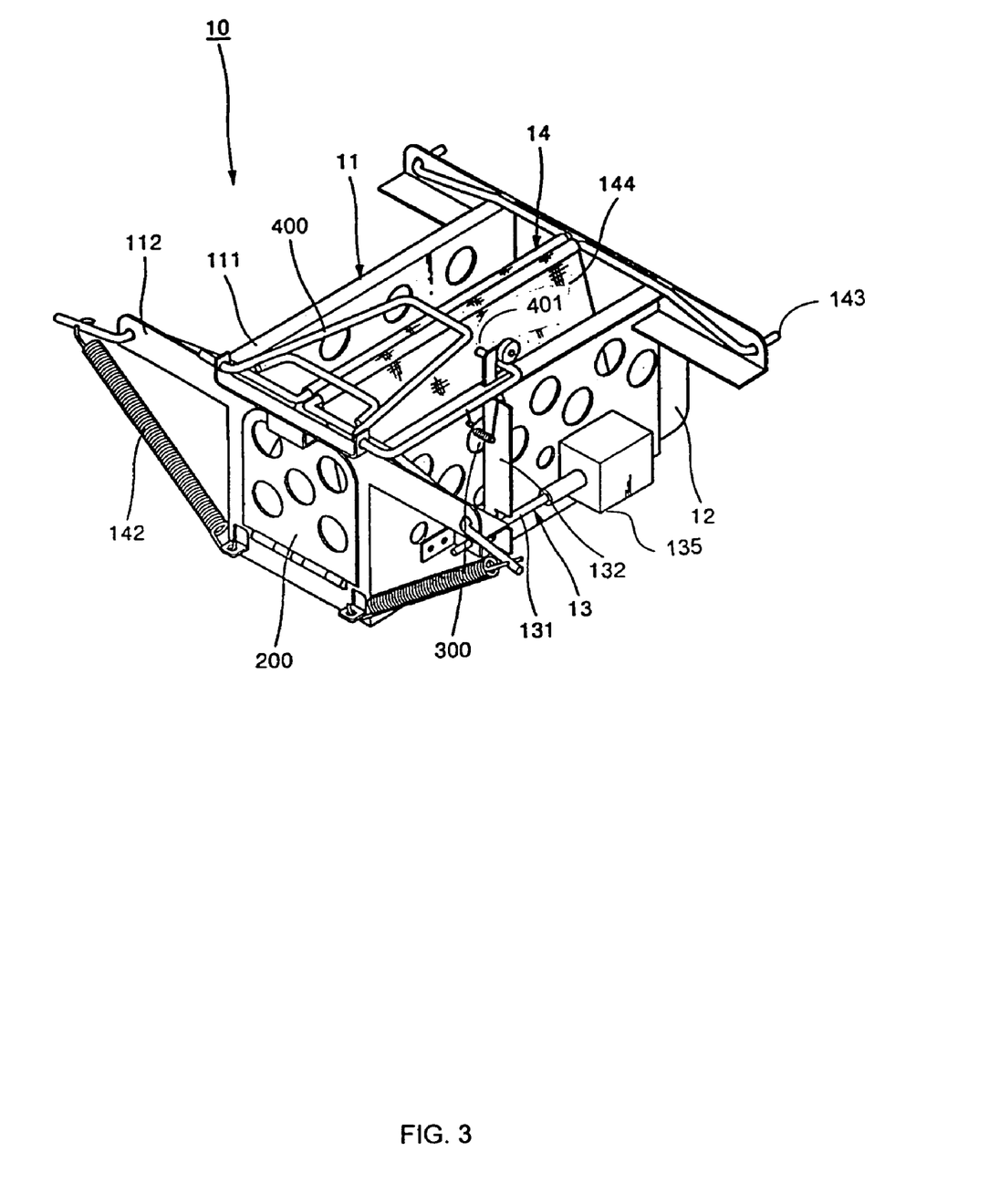
FIG. 3 is a perspective view of a bird launcher for hunt training according to the described embodiment of the invention.

FIG. 3 is a perspective view of a bird launcher for hunt training according to the described embodiment of the invention. A bird launcher 10 for hunt training includes a housing 11, a door 200, a controller 12, an operation assembly 13, and a discharging assembly 14.

Housing 11 is generally a box-type of body 111 opened at its top with support bars 112 extended widthwise from the upper corners of the sidewalls of a body 111. Door 200 located at one of an end and a side of housing 11 allows for easy insertion and extraction of the bird during hunt training. In operation, bird launcher 10 is placed in the locked state and the bird may be inserted into the interior of the bird launcher without fear of injuring the bird.

Operation assembly 13 includes a moving shaft 131, an operating rod 132, an electromagnet 135, and an elastic spring 300. Electromagnet 135 generates a magnetic force in response to the signal generated by controller 12. One end of moving shaft 131 is coupled to the electromagnet while the other end is coupled to operating rod 132. In response to the received signal, electromagnet 135 generates the magnetic force which pulls moving shaft 131 toward the electromagnet. The movement of moving shaft 131 rotates operating rod 132 by a predetermined angle which releases a fixing arm 401 of a fixing member 400 from the locked state. Elastic spring 300 provides a restoring force on operating rod 132 to maintain operating rod 132 in close contact with fixing arm 401.

Discharging assembly 14 includes a plurality of springs 142, a plurality of guide rods 143, a guide belt 144, and fixing member 400 including fixing arm 401. The plurality of guide rods 143 are inserted into apertures formed in the ends of the support bars 112 and guide belt 144 is attached at opposite ends of the plurality of guide rods 143. Fixing member 400 is rotatably attached at one end of the center longitudinal line of housing 11. Fixing member 400 is formed such that one end of fixing member 400 comes in close contact with the plurality of guide rods 143 at the approximate longitudinal center of the guide rods. When placed in the locked state, fixing member 400 places a holding pressure on the approximated center of the plurality of guide rods 143 such that both ends of the plurality of guide rods 143 are approximately equally depressed. Fixing member 400 and the plurality of guide rods 143 are held in the locked state by fixing arm 401 being engaged by operating rod 132. Elastic spring 300 places an elastic pressure on operating rod 132 to prevent accidental movement of the rod.

Fixing arm 401 is released from the locked state when operating rod 132 is rotated in response to the received signal. Once released, fixing arm 401 and fixing member 400 release the holding pressure on the plurality of guide rods 143 and the plurality of guide rods 143 rotate toward the outside of housing 11 by the restoring force of the plurality of springs 142. Guide belt 144 is discharged vertically as the plurality of guide rods 143 rotate toward the outside of housing 11 due to the restoring force of the plurality of springs 142. Because fixing member 400 is at least one-half the length of the plurality of guide rods 143, the guide rods release substantially simultaneously from a balanced position, thereby ensuring a near vertical launch as desired by the hunter.

Figure 4A:
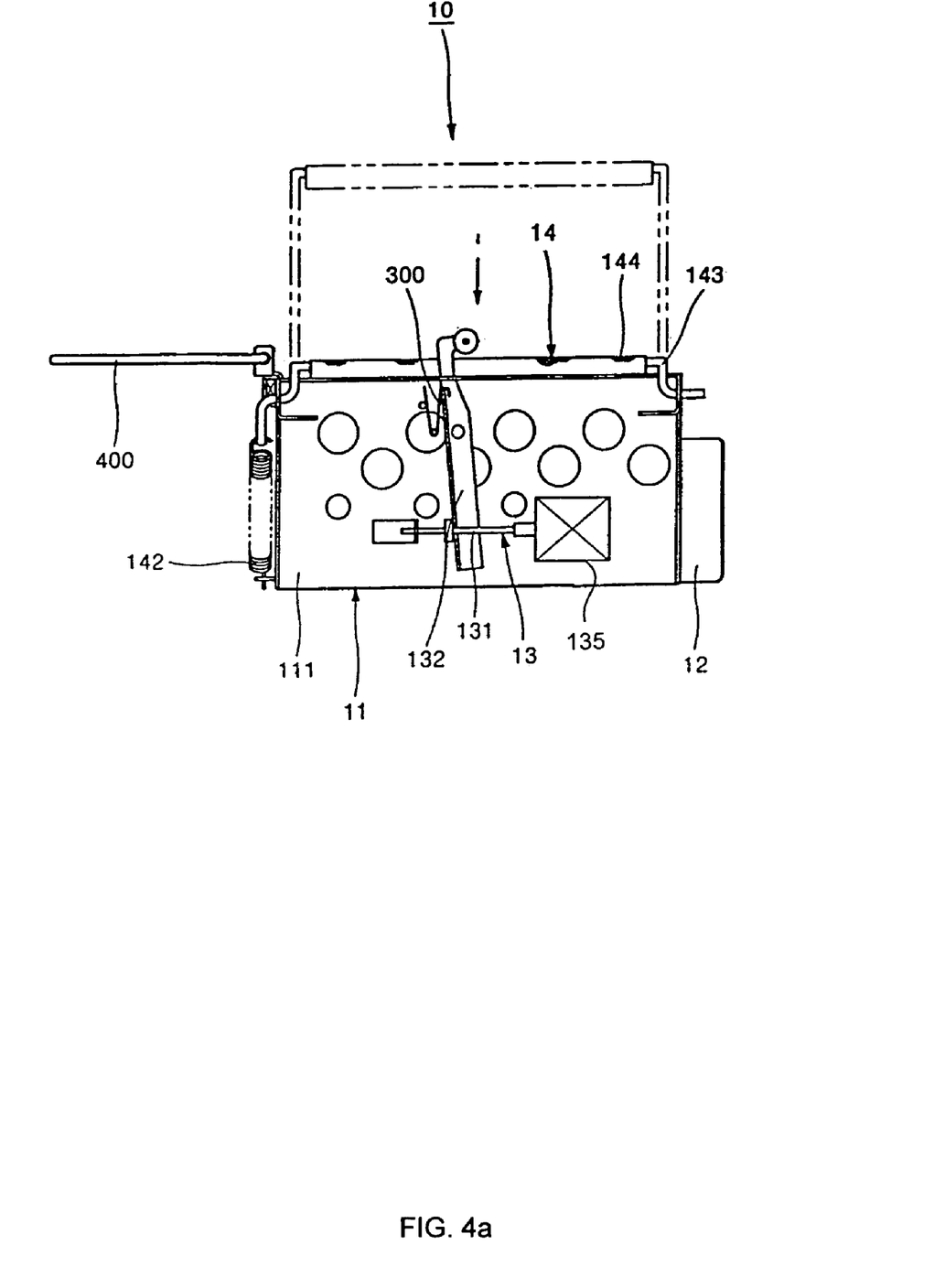
FIGS. 4a and 4b are side views of the present invention.

FIG. 4a is a side view of the present invention. As illustrated by direction 1, the plurality of guide rods 143 rotate down into close contact with housing 11. In doing so, guide belt 144 is lowered into the center of housing 11 forming a cavity inside housing 11 suitable for holding and launching the bird.

Figure 4B:
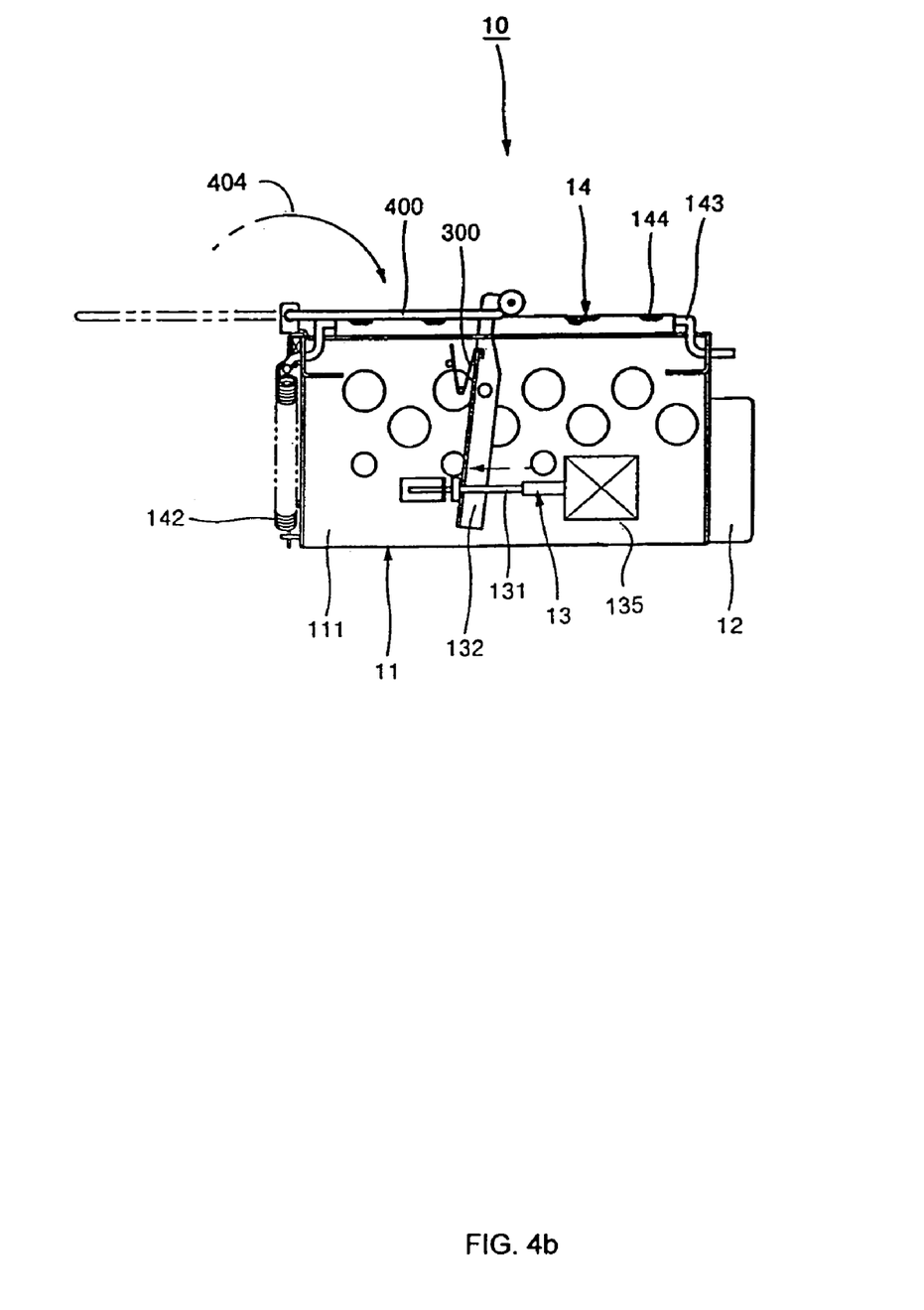

FIG. 4b is a side view of the present invention. After the plurality of guide rods 143 are rotated in towards housing 11, fixing member 400 rotates towards housing 11, as illustrated by direction 404, so that fixing arm 401 engages operating rod 132 which, due to the restoring force of elastic spring 300, holds fixing arm 401 in the locked state.

Figure 4C:
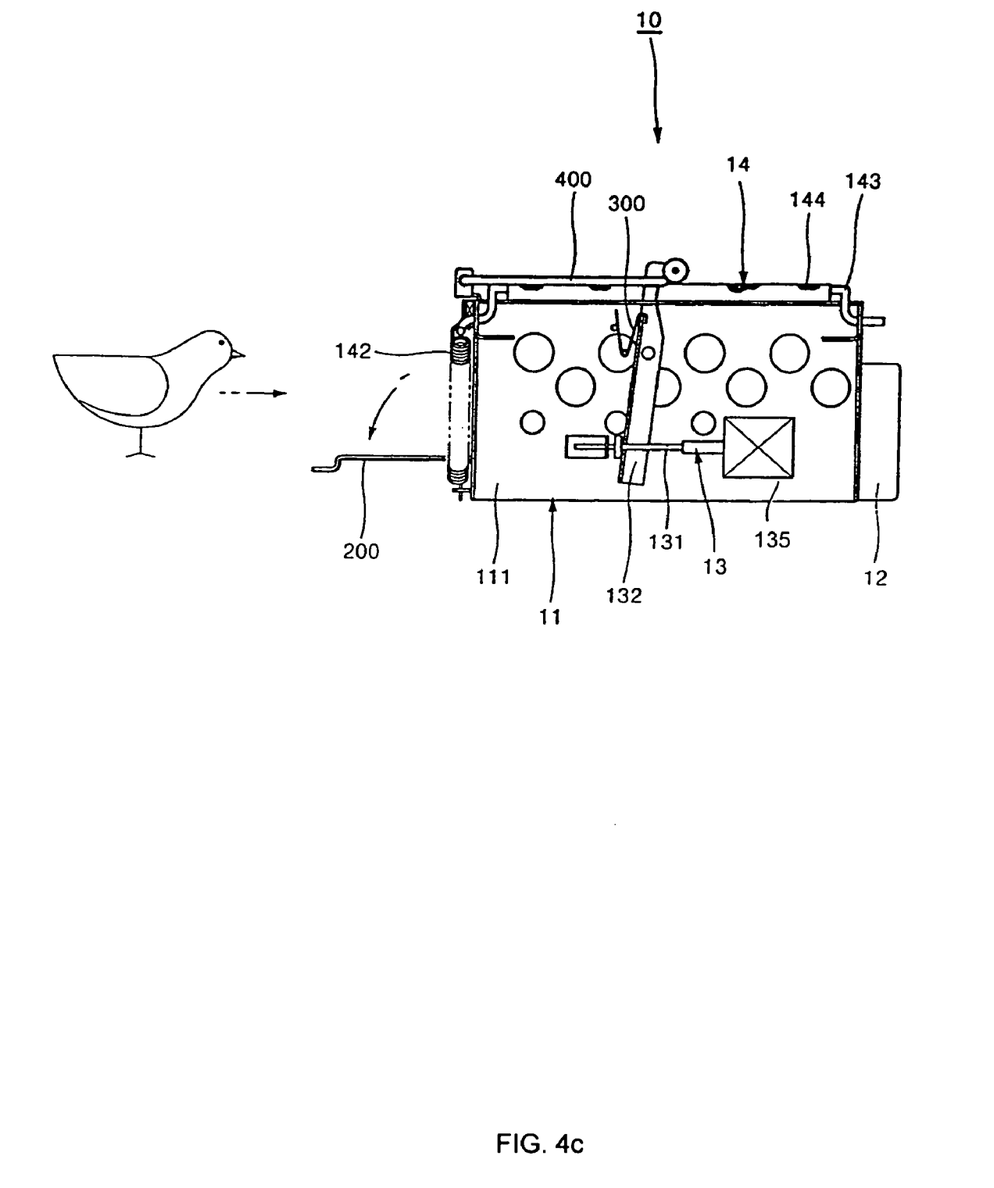
FIG. 4c illustrates insertion of a bird through a door.

FIG. 4c illustrates insertion of the bird through door 200. When the launcher is in the locked state, the door is opened and the bird is inserted through the door opening into the cavity formed by guide belt 144. One of average skill in the art should recognize the advantages of loading the bird into the launcher after the plurality of guide rods 143 and fixing member 400 are in the locked state.

Figure 4D:
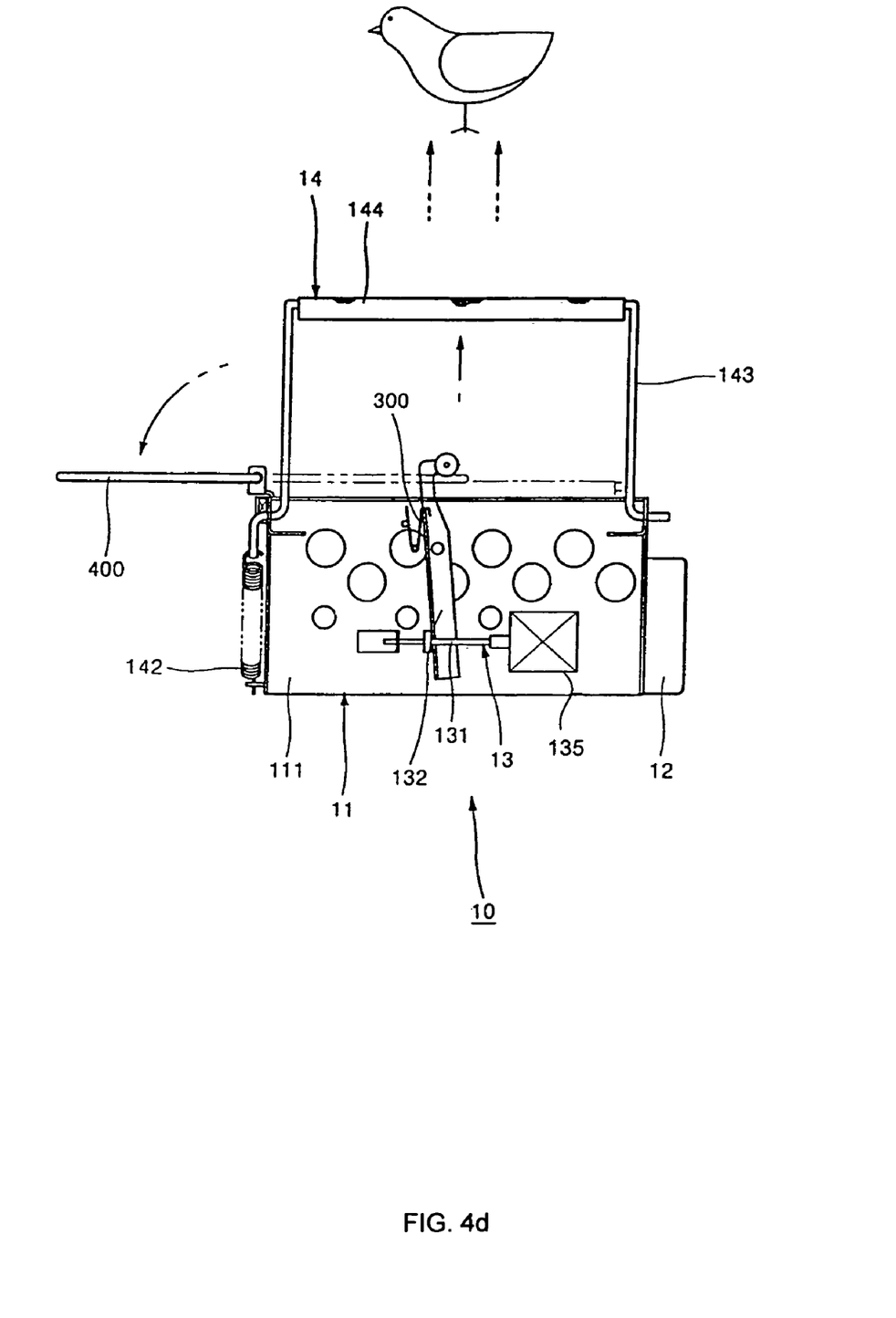
FIG. 4d illustrates launching a bird.

FIG. 4d illustrates launching of the bird. The hunter is positioned approximately 65 to 100 feet (20 to 30 meters) from the bird launcher. He or she prepares to shoot the bird and transmits a signal by use of a remote controller to the bird launcher 10.

At that time, the transmitted signal is received by the controller 12 which in turn generates a signal to electromagnet 135. In response to the generated signal, electromagnet 135 generates a magnetic force that pulls moving shaft 131 toward electromagnet 135. As moving shaft 131 moves in response to the magnetic force, operating rod 132 rotates by the predetermined angle against elastic spring 300 and disengages fixing arm 401 from operating rod 132. As the locked state of fixing member 400 is released, the restoring force of the plurality of springs 142 rotates the plurality of guide rods 143 toward the outside of housing 11. At the same time, fixing member 400 is rotated away from housing 11 and guide belt 144 is discharged vertically by the elasticity of the plurality of guide rods 143 being rotated toward the outside of housing 11. At this moment, the bird launches from the housing at a similar speed to, or faster than, when the bird flushes from the ground.

As described above, the bird is inserted through a door provided on the body of the housing, thereby preventing damage to the wings, neck or legs of the bird. The bird launcher for hunt training can carry the bird in the interior of the housing to the hunting location.

In addition, the bird launcher for hunt training of the present invention includes the fixing member placing pressure at the approximated center of the guide rods thereby preventing the guide rods from opening at the end portions so that the bird is discharged in a direction intended by a hunter. An elastic spring mounted at one side of an operating rod prevents accidental release of the bird and further substantially reduces injury to the bird and the hunter.

The invention disclosed herein is susceptible to various modifications and alternative forms. Specific embodiments therefore have been shown by way of example in the drawings and detailed description. It should be understood, however, that the drawings and detailed description thereto are not intended to limit the invention to the particular form disclosed, but on the contrary, the invention is to cover all modifications, equivalents and alternatives falling within the spirit and scope of the present invention as defined by the claims.

What is claimed is:

1. A bird launcher for hunt training, comprises:
  a housing formed generally as a square box-type of body with an open top;
  support bars extended widthwise from the upper corners of the sidewalls of the body;
  a controller mounted to one side of the housing for receiving signals transmitted from a remote controller;
  an operation assembly, including:
  an electromagnet for generating a magnetic force in response to the received signals;
  a moving shaft coupled to the electromagnet that moves in response to the magnetic force;
  an operating rod, coupled at one end to the moving shaft, wherein the operating rod is rotated to a predetermined angle by the moving shaft in response to the magnetic force; and
  an elastic spring mounted at a second end of the operating rod and positioned to place a restoring force of the elastic spring in opposition to the rotation of the operating rod to prevent an accidental rotation of the operating rod;
  a discharging assembly for launching a bird; including
  a plurality of springs to provide a restoring force to launch the bird;
  a plurality of guide rods, wherein each end of the plurality of guide rods is inserted into apertures formed at each end of each of the support bars, the plurality of guide rods being rotated toward the outside of the housing by the restoring force of the pair of the plurality of springs;
  a guide belt coupled to each of the plurality of guide rods, wherein the guide belt is discharged in a vertical direction through the open top of the housing when the plurality of guide rods are rotated toward the outside of the housing; and
  a fixing member, located on the bird launcher's longitudinal center line, for placing a holding pressure at an approximate one-half a length of the guide rods, the fixing member including a fixing arm for engaging the operating rod, wherein the discharging assembly is in a locked state when the fixing arm is engaged with operating rod; and
  a door mounted at one of a side or an end of the body of the housing, the door for inserting and removing a bird.

2. A method for launching a bird for hunt training, comprises:
- generating a spring restoring force by rotating guide rods toward the open top of a bird launcher housing, wherein one end of each guide rod is coupled to one end of a pair of springs and wherein a guide belt coupled to each guide rod forms a cavity inside the housing suitable for holding a bird;
- holding the guide rods in a closed position with a fixing member positioned to place a holding pressure in an approximated center of the guide rods;
- placing the fixing member in a locked state by rotating an operating rod to a predetermined angle, wherein the rotated operating rod engages a fixing rod of the fixing member;
- securing the operating rod in the locked state through the restoring force of an elastic spring, wherein the restoring force of the elastic spring is placed in opposition to the rotation of the operating rod;
- opening a door located in one of a side or an end of the housing;
- receiving a bird for launching through the door and into the cavity formed by the guide belt; and
- launching the bird by generating a control signal to rotate the operating rod to the predetermined angle.

3. The method of claim 2, wherein the step of launching comprises:
- releasing the restoring force generated by the springs;
- releasing the fixing member from the locked state; and
- discharging the guide belt in a vertical direction through the open top of the housing in response to releasing the fixing member, wherein the discharging of the guide belt launches the bird.

4. The method of claim 2 further including receiving a plurality of birds for a single launch.

5. A bird launcher for hunt training, comprises:
- a housing formed generally as a square box-type of body with an open top;
- a door mounted at one of a side or an end of the body of the housing, the door for inserting and removing a bird;
- launch mechanism for launching the bird, the launch mechanism including a plurality of pivotally connected guide rods; and
- a fixing member pivotally attached at one end of a center longitudinal line of the bird launcher, which fixing member is sized to apply a restraining pressure at an approximate longitudinal center of a plurality of guide rods of the launch mechanism to prevent launching motion of the launch mechanism.

6. The bird launcher of claim 5 wherein the launch mechanism further comprises support bars extended widthwise from upper corners of sidewalls of the body.

7. The bird launcher of claim 5 wherein the launch mechanism further comprises a controller mounted to one side of the housing for receiving signals transmitted from a remote controller.

8. The bird launcher of claim 5 wherein the launch mechanism further comprises an assembly further including:
- an electromagnet for generating a magnetic force in response to the received signals;
- a moving shaft coupled to the electromagnet that moves in response to the magnetic force;
- an operating rod, coupled at one end to the moving shaft, wherein the operating rod is rotated to a predetermined angle by the moving shaft in response to the magnetic force; and
- an elastic spring mounted at a second end of the operating rod and positioned to place a restoring force of the elastic spring in opposition to the rotation of the operating rod to prevent an accidental rotation of the operating rod.

9. The bird launcher of claim 5 wherein the launch mechanism further comprises a discharging assembly for launching a bird; including:
- a plurality of springs to provide a restoring force to launch the bird;
- a plurality of guide rods, wherein each end of the plurality of guide rods is inserted into apertures formed at each end of each of the support bars, the plurality of guide rods being rotated toward the outside of the housing by the restoring force of the pair of the plurality of springs;
- a guide belt coupled to each of the plurality of guide rods, wherein the guide belt is discharged in a vertical direction through the open top of the housing when the plurality of guide rods are rotated toward the outside of the housing; and
- a fixing member, located on the bird launcher's longitudinal center line, for placing a holding pressure at an approximate one-half a length of the guide rods, the fixing member including a fixing arm for engaging the operating rod, wherein the discharging assembly is in a locked state when the fixing arm is engaged with operating rod.

* * * * *